(12) United States Patent
Saito

(10) Patent No.: US 11,378,400 B2
(45) Date of Patent: Jul. 5, 2022

(54) OFFSET CALCULATION DEVICE, OFFSET CORRECTION DEVICE, AND OFFSET CALCULATION METHOD

(71) Applicant: LAPIS Semiconductor Co., Ltd., Yokohama (JP)

(72) Inventor: Takayuki Saito, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 162 days.

(21) Appl. No.: 16/743,437

(22) Filed: Jan. 15, 2020

(65) Prior Publication Data
US 2020/0278206 A1 Sep. 3, 2020

(51) Int. Cl.
*G01C 19/5776* (2012.01)

(52) U.S. Cl.
CPC ................ *G01C 19/5776* (2013.01)

(58) Field of Classification Search
None
See application file for complete search history.

(56) References Cited

U.S. PATENT DOCUMENTS

| 9,534,924 B2 * | 1/2017 | Ahuja .................. G16Z 99/00 |
| 2009/0295722 A1 * | 12/2009 | Yamamoto .......... G06F 3/0346 345/158 |

FOREIGN PATENT DOCUMENTS

JP   H07-324941 A   12/1995

* cited by examiner

*Primary Examiner* — Roy Y Yi
(74) *Attorney, Agent, or Firm* — Rabin & Berdo, P.C.

(57) ABSTRACT

An offset calculation device includes a determination unit configured to determine a rotation state of an object having an angular velocity sensed by a gyro sensor based on a moving average value of sensed angular velocity during a plurality of time periods differing from each other, the moving average value being calculated from chronological data of numerical values corresponding to the sensor data output from the gyro sensor. The offset calculation device further includes a calculation unit configured to calculate an offset value of the sensor data based on the sensor data corresponding to a time period in which the target object was deemed to be in a non-rotation state by the determination unit.

12 Claims, 16 Drawing Sheets

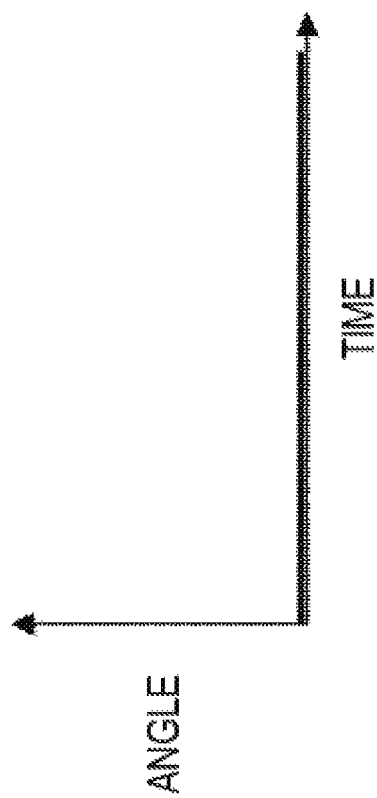

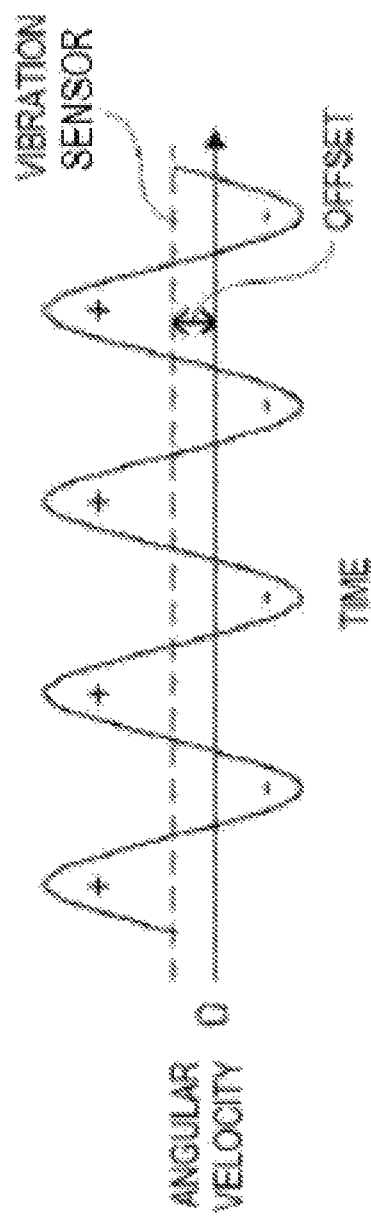

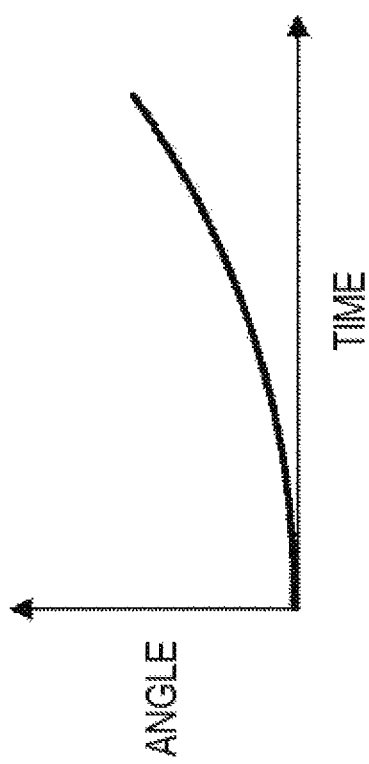

FIG. 8

| TIME | 1 | 2 | 3 | 4 | 5 | 6 | 7 | 8 | ... | 12 | 13 | ... | 25 | 26 | 27 | ... | 35 | 36 | 37 | ... |
|---|---|---|---|---|---|---|---|---|---|---|---|---|---|---|---|---|---|---|---|---|
| ANGULAR VELOCITY | 3 | 4 | 2 | 6 | 4 | 2 | 5 | 6 | ... | 4 | 2 | ... | 6 | 4 | 2 | ... | 3 | 4 | 2 | ... |
| A | | | 3.80 | 3.60 | 3.80 | 4.60 | 4.20 | 4.40 | ... | 3.40 | 3.20 | ... | 3.60 | 3.80 | 4.60 | ... | 3.00 | 3.00 | 3.80 | ... |
| B | | | | | | | 4.04 | 3.98 | ... | 3.76 | 3.72 | ... | 3.98 | 4.04 | 4.08 | ... | 3.70 | 3.68 | 3.70 | ... |
| C | | | | | | | 0.16 | 0.42 | ... | -0.36 | -0.52 | ... | -0.38 | -0.24 | 0.52 | ... | -0.70 | -0.68 | 0.10 | ... |
| D | | | | | | | 0.03 | 0.18 | ... | 0.13 | 0.27 | ... | 0.14 | 0.06 | 0.27 | ... | 0.49 | 0.46 | 0.01 | ... |
| E1 | | | | | | | | | | | | | 0.20 | 0.21 | 0.19 | 0.20 | ... | 0.18 | 0.21 | 0.20 | ... |
| E2 | | | | | | | | | | | | | | | | 0.21 | 0.22 | 0.22 | 0.21 | ... |

OFFSET CALCULATION DEVICE, OFFSET CORRECTION DEVICE, AND OFFSET CALCULATION METHOD

BACKGROUND OF THE INVENTION

Technical Field

The present invention relates to an offset calculation device, offset correction device, and offset calculation method.

Background

In order to improve the degree of accuracy in determining a rotation state based on sensor data for the angular velocity detected by a gyro sensor, various methods for removing an offset from the sensor data have been proposed. Examples thereof include setting an offset value by finding the average value of the sensor data in a nonrotation state, and correcting the output sensor data using the offset value.

For example, the offset drift correction device described in Japanese Patent Application Laid-open Publication No. H7-324941 (Patent Document 1) determines whether a moving object equipped with a gyro sensor is in a rotation state or not using a threshold value for the size of the angular velocity output from the gyro sensor. Also, the offset drift correction device finds an average value of the difference (error value) between the output of the gyro sensor and the output of an adaptive filter (estimated offset level), and updates the estimated offset level using the averaged error value only when the moving object is deemed to be in the nonrotation state.

When a device equipped with a gyro sensor is in a moving state such as walking or driving, vibration sometimes occurs in one direction even when the device itself is in a nonrotation state.

FIGS. 1 and 2 illustrate an example of sensor data output from a gyro sensor that is not rotating but moving. FIGS. 1A and 2A illustrate a temporal change of angular velocity, based on sensor data, and FIGS. 1B and 2B illustrate a temporal change of the angle, which is an integral value of angular velocity. As shown in FIG. 1A, when the vibration in the sensor data is even, the angle stays the same over time as in FIG. 1B. On the other hand, in some of the moving states, the vibration of the sensor data becomes off-centered as shown with FIG. 2A, and in this case, the angle changes over time as in FIG. 2B. For example, if a user puts a device equipped with a gyro sensor in a pocket and starts walking, even if the user walks straight, the vibration of the sensor data of the gyro sensor can be off-centered.

In any cases, vibrations that occur in the nonrotation state causes the device of Patent Document 1 to have a problem in that, if a rotation state of the moving object is determined based on the data over a short period of time, the nonrotation state can be erroneously deemed as a rotation state, and in that case, the estimated offset level would not be updated.

SUMMARY OF THE INVENTION

The present invention was made in view of this point, and an object thereof is to accurately calculate an offset value even in a moving state.

An offset calculation device according to an embodiment of the present invention includes: a determination unit configured to determine a rotation state of an object to be sensed by an angular velocity sensor based on a moving average value of a plurality of time periods differing from each other, the moving average value being calculated from time-series data of the numerical values corresponding to the sensor data output from the angular velocity sensor; and a calculation unit configured to calculate an offset value of the sensor data based on the sensor data corresponding to the time period in which the object was deemed to be in a nonrotation state by the determination unit.

An offset calculation method according to an embodiment of the present invention includes: determining a rotation state of an object to be sensed by an angular velocity sensor based on a moving average value of a plurality of time periods differing from each other, the moving average value being calculated from time-series data of the numerical values corresponding to the sensor data output from the angular velocity sensor; and calculating an offset value of the sensor data based on the sensor data corresponding to the time period in which the object was deemed to be in a nonrotation state.

According to embodiments of the present invention, the offset value can be calculated accurately even in a moving state.

BRIEF DESCRIPTION OF THE DRAWINGS

FIGS. 1A and 1B illustrate examples of sensor data output from a gyro sensor that is not rotating but moving.

FIGS. 2A and 2B illustrate examples of sensor data output from a gyro sensor that is not rotating but moving.

FIG. 8 is a diagram showing an example of the deriving process and the first and second rotation determination processes of Embodiment 1.

DETAILED DESCRIPTION OF THE INVENTION

Figure 1A:
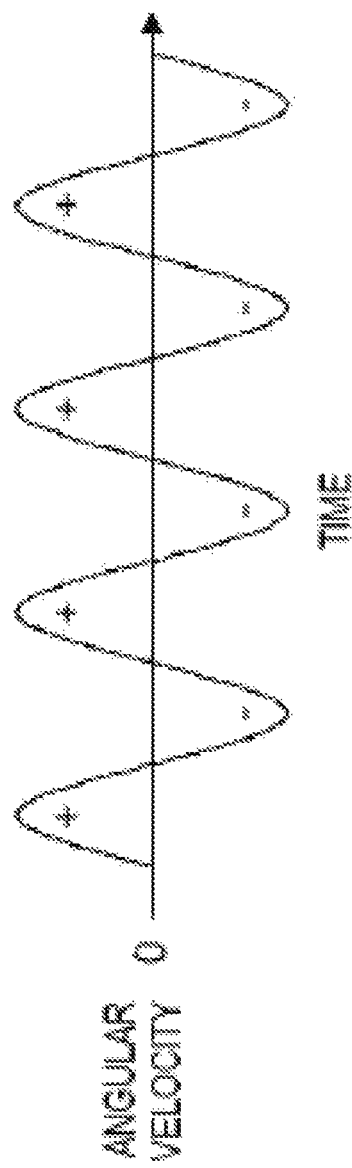

Below, embodiments of the present invention will be explained in detail with reference to figures. In each figure, components that are the same as or equivalent to each other are given the same reference characters.

Figure 3:
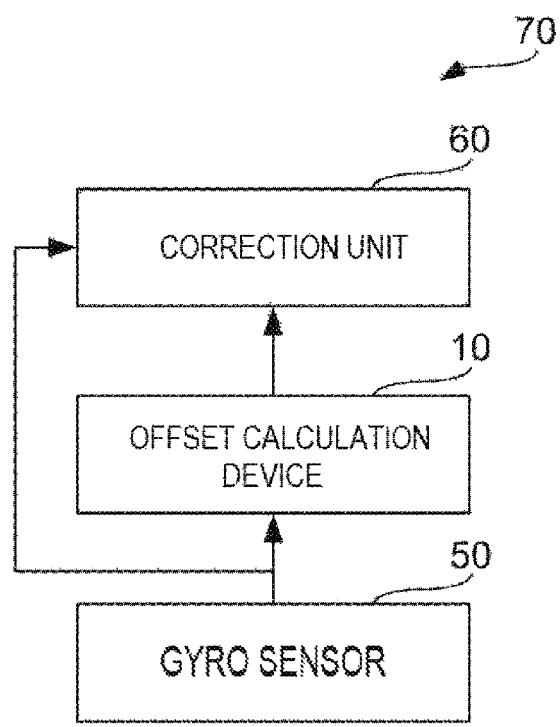
FIG. 3 is a block diagram illustrating an example of the configuration of an offset correction device of each embodiment of the present invention.

First, with reference to FIG. 3, the functional configuration of the offset correction device 70 of each embodiment will be explained. As shown in FIG. 3, the offset correction device 70 includes an offset calculation device 10, a gyro sensor 50, and a correction unit 60. The sensor data for the angular velocity value output from the gyro sensor 50 is input into the offset calculation device 10 and the correction unit 60. The offset value output from the offset calculation device 10 is input into the correction unit 60. The offset correction device 70 is installed in a portable terminal device such as smartphones and tablet computers, for example.

The gyro sensor 50 detects an angular velocity to be sensed, and outputs an angular velocity value indicating the detected angular velocity as the sensor data. The gyro sensor 50 may detect an angular velocity value of a particular one axis or detect an angular velocity of each of a plurality of axes (two or three), for example. When the gyro sensor 50 is a sensor detecting the angular velocity of one axis, the gyro sensor 50 outputs the angular velocity value of that axis as the sensor data. When the gyro sensor 50 is a sensor detecting the angular velocity of a plurality of axes, the angular velocity value of each axis is output as the sensor data, and in this case, the angular velocity of the respective axis may be detected by one device or by different devices.

The offset calculation device 10 calculates an offset value corresponding to an offset amount that overlaps with the sensor data output from the gyro sensor 50.

The correction unit 60 corrects the sensor data output from the gyro sensor 50 based on the offset amount calculated by the offset calculation device 10. The correction unit 60 does not have to be a separate device from the offset calculation device 10, and may be constituted of the same device as the offset calculation device 10.

Figure 4:
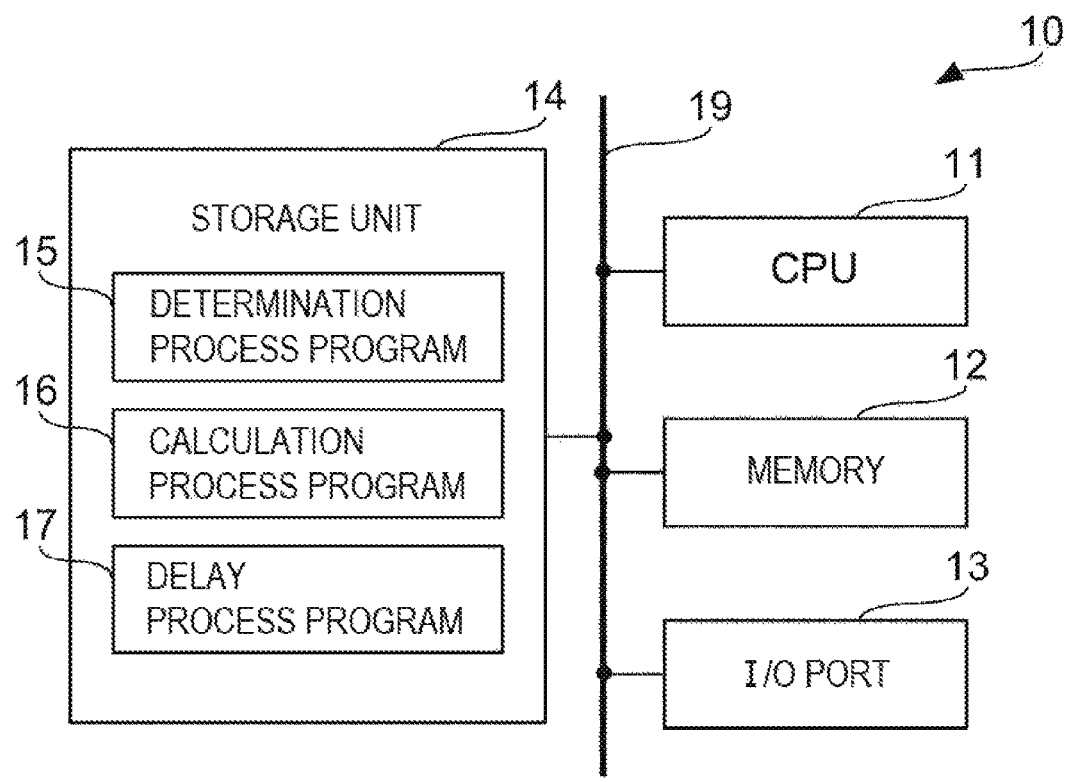
FIG. 4 is a block diagram illustrating an example of the hardware configuration of an offset calculation device of each embodiment of the present invention.

Next, with reference to FIG. 4, the hardware configuration of the offset calculation device 10 of this embodiment will be explained. As shown in FIG. 4, the offset calculation device 10 includes a CPU (central processing unit) 11, a memory 12 as a temporary memory area, an input/output port 13, and a non-volatile storage unit 14. The CPU 11, memory 12, input/output port 13, and storage unit 14 are connected to a bus 19, respectively.

The storage unit 14 is realized by a non-volatile storage medium such as HDD (hard disk drive), SSD (solid state drive), and flash memory. The storage unit 14 as the storage medium has stored therein a determination process program 15, a calculation process program 16, and a delay process program 17. The CPU 11 reads out each program from the storage unit 14, loads the read-out program to the memory 12, and executes the loaded program. The offset calculation device 10 and correction unit 60 may include dedicated processing circuitry that is particularly wired for receiving sensor data from the gyro sensor 50, performing a calculation, and performing a correction. Alternatively, the offset calculation device 10 and correction unit 60 may utilize processing circuitry that may also perform other functions, such as one or more processors or CPUs 11 that control other functions of a smartphone or tablet computer, and the particular functions of the offset calculation device 10 and correction unit 60 may be determined by software stored in memory 12 that controls the processing circuitry to perform the specific functions that result in the more accurate offset values according to embodiments of the present invention.

Embodiment 1

Figure 5:
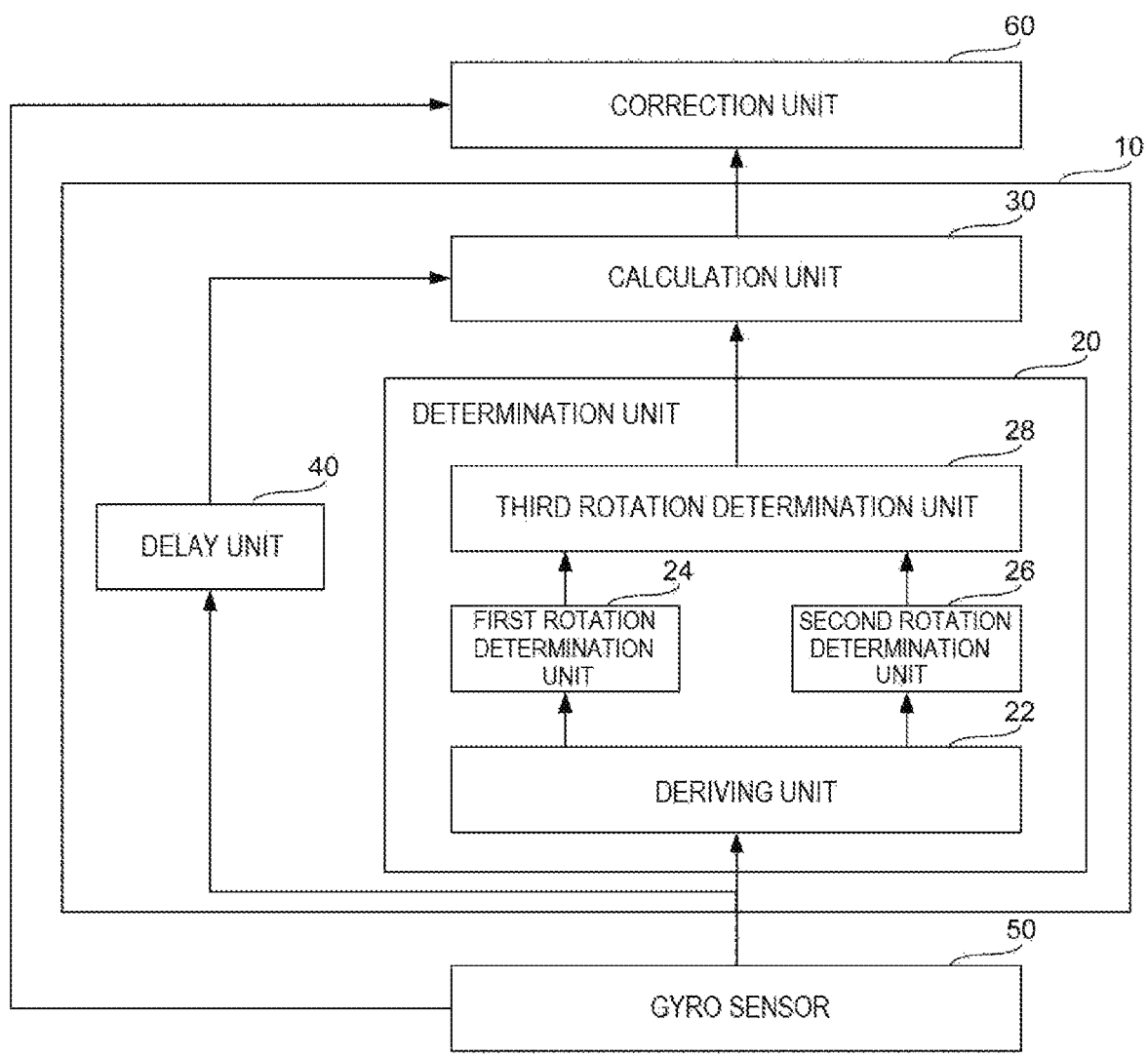
FIG. 5 is a block diagram illustrating an example of the functional configuration of an offset calculation device of Embodiment 1.

With reference to FIG. 5, the functional configuration of the offset calculation device 10 of this embodiment will be explained. As shown in FIG. 5, the offset calculation device 10 includes a determination unit 20, a calculation unit 30, and a delay unit 40. The CPU 11 functions as the determination unit 20 by executing the determination process program 15. The CPU 11 functions as the calculation unit 30 by executing the calculation process program 16. The CPU 11 functions as the delay unit 40 by executing the delay process program 17. In other words, the determination unit 20, calculation unit 30, and delay unit 40 each comprise a CPU 11 or processor and memory 12, which may be the same CPU and memory, or may include multiple separate CPUs. FIG. 5 also shows the gyro sensor 50 and the correction unit 60 that are used together with the offset calculation device 10 to more accurately measure gyro rotation my more accurately determining offset values.

The determination unit 20 determines the rotation state of the offset correction device 70 based on the moving average value of a plurality of time periods differing from each other, which was calculated from time-series data of the numerical values corresponding to the sensor data output from the gyro sensor 50. The determination unit 20 includes a deriving unit 22, the first rotation determination unit 24, the second rotation determination unit 26, and the third rotation determination unit 28.

The driving unit 22 derives the time-series data of numerical values corresponding to the sensor data output from the gyro sensor 50. Specifically, the deriving unit 22 calculates the moving average value A of the angular velocity indicated by the sensor data output from the gyro sensor 50, and then calculates the moving average value B by figuring out the moving average of the moving average values A. The deriving unit 22 derives the time-series data of the value D, which is obtained by raising the difference C between the moving average value A and the moving average value B to the second power.

The first rotation determination unit 24 derives a moving average value for the first period from the time-series data of the numerical value D derived by the deriving unit 22, determines a temporary rotation state of a device equipped with the offset correction device 70 (a portable terminal device such as a smartphone and tablet computer, for example; hereinafter referred to as a target device), and outputs a temporary first rotation determination result. The first period is a length of the data section of the time-series data of the value D used by the first rotation determination unit 24 to derive the moving average value.

The second rotation determination unit 26 derives a moving average value for the second period, which is longer than the first period, from the time-series data of the numerical value D derived by the deriving unit 22, determines a temporary rotation state of the target device, and outputs a temporary second rotation determination result. The second period is a length of the data section of the time-series data of the value D used by the second rotation determination unit 26 to derive the moving average value.

The third rotation determination unit 28 determines the final rotation state of the target device based on the combination of the first rotation determination result and the second rotation determination result, and outputs the third rotation determination result, which is the final result. The third rotation determination unit 28 determines whether the target device is in a rotation state, a nonrotation state, or a determination-deferred state, and outputs the determination result as the third rotation determination result.

The delay unit 40 outputs the sensor data after delaying it by a prescribed delay time. The delay unit 40 may be any type of delay device, including one or more inverter circuits, delay processing circuitry of the CPU 11, or a processing of a delay function by the CPU 11. The prescribed delay time is a period of time corresponding to a delay time that occurs in each process of the determination unit 20 (that is, a period between the time when the sensor data from the gyro sensor 50 is input into the deriving unit 22 and the time when the third rotation determination result is output from the third rotation determination unit 28). That is, the delay unit 40 delays the sensor data output from the gyro sensor 50 according to the delay time of each process of the determination unit 20, so that the sensor data output from the delay unit 40 coincides with the output timing of the third rotation determination result output from the determination unit 20.

The calculation unit 30 calculates the offset value of the sensor data based on the sensor data corresponding to the time period in which the target device was in the nonrotation state, which was determined by the determination unit 20. That is, if the third rotation determination result indicates that the target device is in a nonrotation state, the calculation unit 30 is configured to calculate an offset value of the sensor data based on the sensor data corresponding to a period of time in which the target device is in the nonrotation state.

If the third rotation determination result of the third rotation determination unit indicates that the target device is continuously in the determination-deferred state (the method of determination is described in further detail, below), the calculation unit 30 presumes that the target device was in the nonrotation state during the time period of the determination-deferred state, and retrospectively calculates an offset value of the sensor data based on the sensor data corresponding to a period of time in which the target object was in the determination-deferred state. If the third rotation determination result of the third rotation determination unit changes from the determination-deferred state to the nonrotation state within a prescribed period of time, the calculation unit 30 presumes that the target device was in the nonrotation state during the time period of the determination-deferred state, and retrospectively calculates an offset value of the sensor data based on the sensor data corresponding to a period of time in which the target device was in the determination-deferred state. If the third rotation determination result of the third rotation determination unit changes from the determination-deferred state to the rotation state within a prescribed period of time, the calculation unit 30 presumes that the target device was in the rotation state during the time period of the determination-deferred state, and retrospectively determines that an offset value is not to be calculated based on the sensor data corresponding to a period of time in which the target object was in the determination-deferred state.

The calculation unit 30 calculates the offset value of the sensor data using the delayed sensor data output from the delay unit 40. That is, the calculation unit 30 calculates an offset value of the sensor data based on the determination result of the rotation state of the target device, which was output from the determination unit 20, and the delayed sensor data, which was output from the delay unit 40.

The operation of the determination unit 20 of this embodiment will be explained below. By the CPU 11 executing the determination process program 15, the deriving process of the driving unit 22, the first rotation determination process in the first rotation determination unit 24, the second rotation determination process in the second rotation determination unit 26, and the rotation determination process in the third rotation determination unit 28 are conducted.

Figure 6:
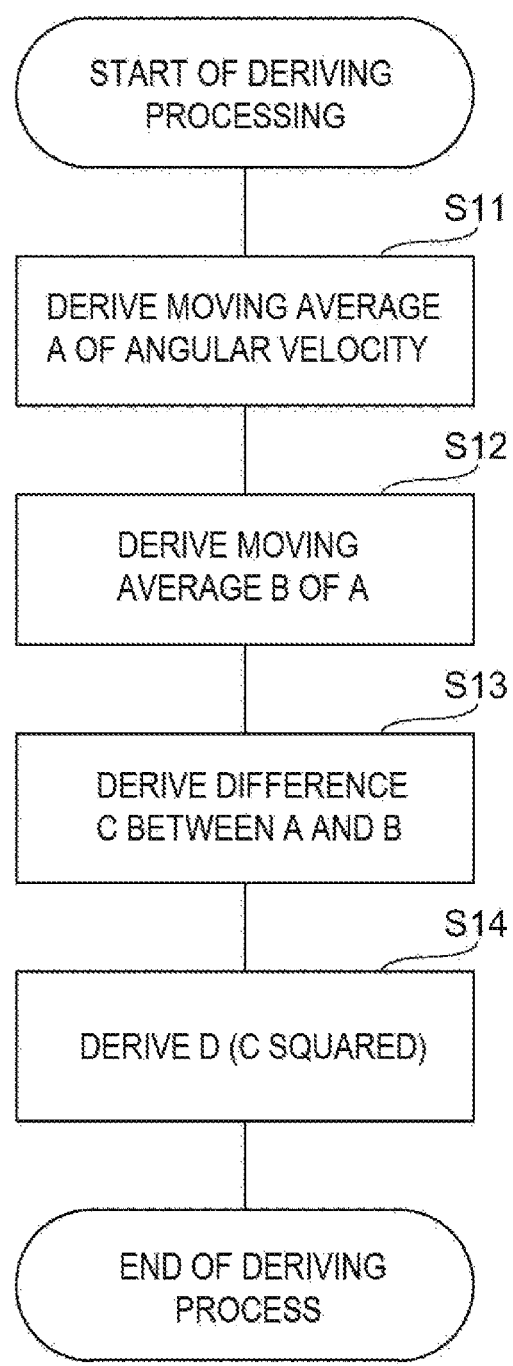
FIG. 6 is a flowchart showing an example of a deriving process of Embodiment 1.

First, with reference to FIG. 6, the deriving process of this embodiment will be explained. The deriving process of FIG. 6 is conducted when the offset calculation device 10 receives the sensor data output from the gyro sensor 50, for example.

In Step S11, the deriving unit 22 calculates the moving average value A by performing the moving average process on the sensor data output from the gyro sensor 50. In Step S12, the deriving unit 22 calculates the moving average value B by further performing the moving average process on the moving average value A. In Step S13, the deriving unit 22 derives the difference C between the moving average value A and the moving average value B. In Step S14, the deriving unit 22 calculates the value D, which was obtained by raising the difference C to the second power. The deriving unit 22 repeats the process from Step S11 to Step S14, thereby deriving the time-series data of the value D.

Figure 7:
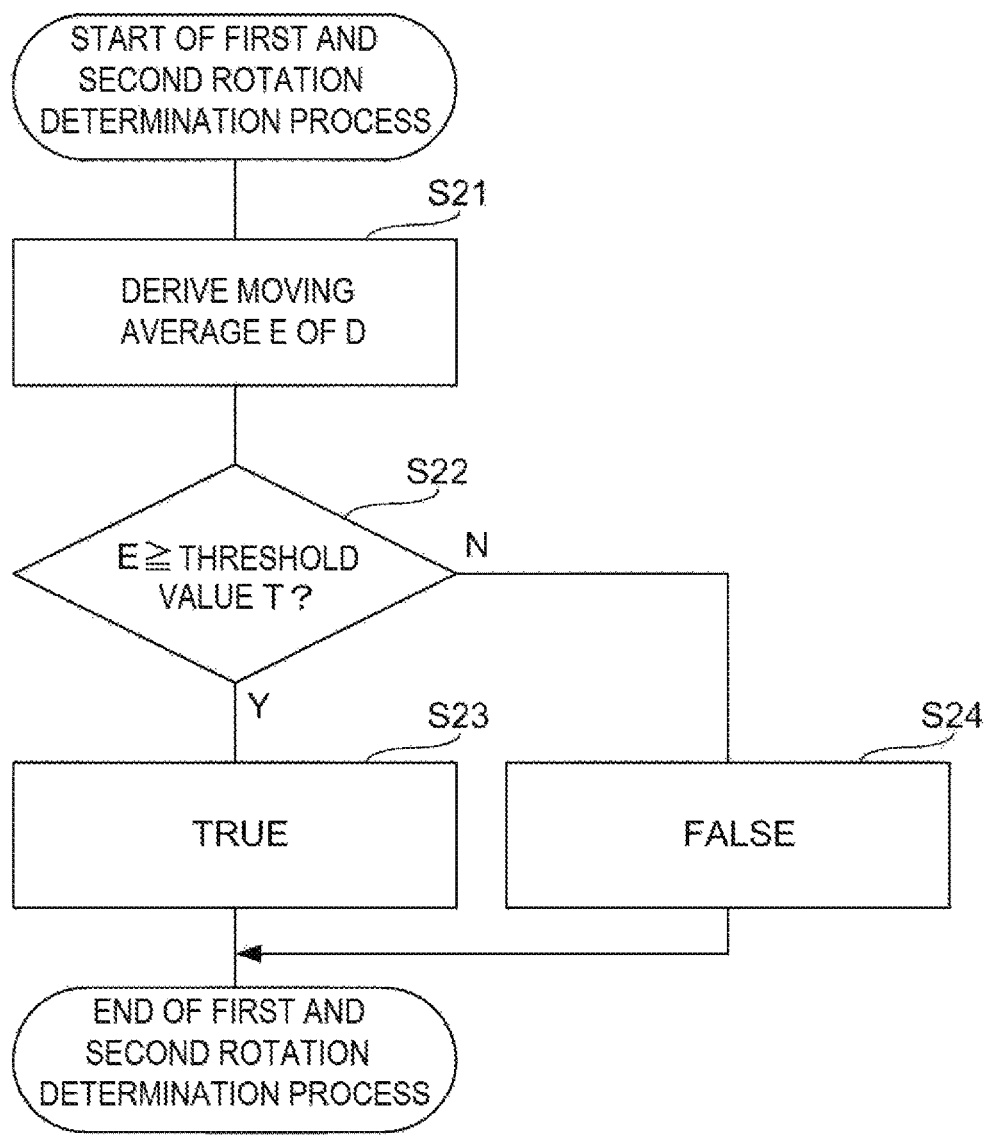
FIG. 7 is a flowchart showing an example of the first and second rotation determination processes of Embodiment 1.

Next, with reference to FIG. 7, the first rotation determination process and the second rotation determination process of this embodiment will be explained. The first and second rotation determination processes of FIG. 7 are conducted after the time-series data of the value D was derived in the deriving unit 22, for example. The moving average value E in FIG. 7 is described as the moving average value E1 in the first rotation determination process (see FIG. 8), and the moving average value E2 in the second rotation determination process, respectively.

First, the first rotation determination process will be explained. In Step S21, the first rotation determination unit 24 performs a moving average process for the first period on the time-series data of the value D derived in the deriving unit 22, thereby deriving the moving average value E1.

In Step S22, the first rotation determination unit 24 compares the moving average value E1 with a threshold value T. The threshold value T is set in advance. When the moving average value E1 is equal to or greater than the threshold value T (Step S22, Y), the first rotation determination unit 24 determines that the target device might be in a rotation state, and sets the first rotation determination result, which is a temporary result, to TRUE (Step S23). On the other hand, when the moving average value E1 is smaller than the threshold value T (Step S22, N), the first rotation determination unit 24 determines that the target device might be in a nonrotation state, and sets the first rotation determination result, which is a temporary result, to FALSE (Step S24).

In the second rotation determination process, the second rotation determination unit 26 conducts a process similar to the first rotation determination process, and derives the second rotation determination result, but in Step S21, the second rotation determination unit 26 derives the moving average value E2 by performing the moving average process based on the second period that is longer than the first period. That is, the length of data section used to derive the moving average value E2 is longer than the length of data section used to derive the moving average value E1. The threshold value T in Step S22 is the same as that of the first rotation determination process described above.

FIG. 8 shows an example of the deriving process and the first and second rotation determination processes. The time illustrated in FIG. 8 is the time from the start of the deriving process, for example. The angular velocity is an angular velocity value of the sensor data output from the gyro sensor 50. FIG. 8 shows angular velocity values of every one second, but the measurement interval of the gyro sensor 50 is not limited to one second, and may be any other intervals. A is the moving average value A derived by the deriving unit 22 in Step S11 of the driving process, B is the moving average value B derived by the deriving unit 22 in Step S12 of the driving process, C is a difference C derived by the deriving unit 22 in Step S13 of the driving process, and D is the value D derived by the deriving unit 22 in Step S14 of the deriving process. E1 is the moving average value E1 derived by the first rotation determination unit 24 of Step S21 of the first rotation determination process, and E2 is the moving average value E2 derived by the second rotation determination unit 26 in Step S21 of the second rotation determination process.

First, the deriving unit 22 derives the moving average value A of the angular velocity (Step S11). The length of the data section used to derive the moving average value A is set to 5 seconds, for example. The longer the data section used to derive the moving average value A is, the more accurately the rotation state can be determined, but it creates a longer delay.

Next, the deriving unit 22 calculates the moving average value B by further performing the moving average process on the moving average value A (Step S12). It is preferable that the length of the data section used to derive the moving average value B be longer than that of the data section used to derive the moving average value A in order to improve the determination accuracy, and the length is set to 10 seconds, for example.

Next, the deriving unit 22 derives the difference C between the moving average value A and the moving average value B (Step S13). That is, the difference C is the deviation of the moving average value A. Next, the deriving unit 22 calculates the value D, which was obtained by raising the difference C to the second power (Step S14).

Next, the first rotation determination unit 24 and the second rotation determination unit 26 derive the moving average values E1 and E2 of the value D, respectively (Step S21). That is, the moving average values E1 and E2 are the distribution values of the moving average value A. The distribution value becomes greater if the target device is in a rotation state than in a nonrotation state. It is preferable that the length of the data section used to derive the moving average value E1 be longer than that of the data section used to derive the moving average value B in order to improve the determination accuracy, and the length is set to 20 seconds, for example. The length of the data section used to derive the moving average value E2 is set to 30 seconds, for example.

Figure 11:
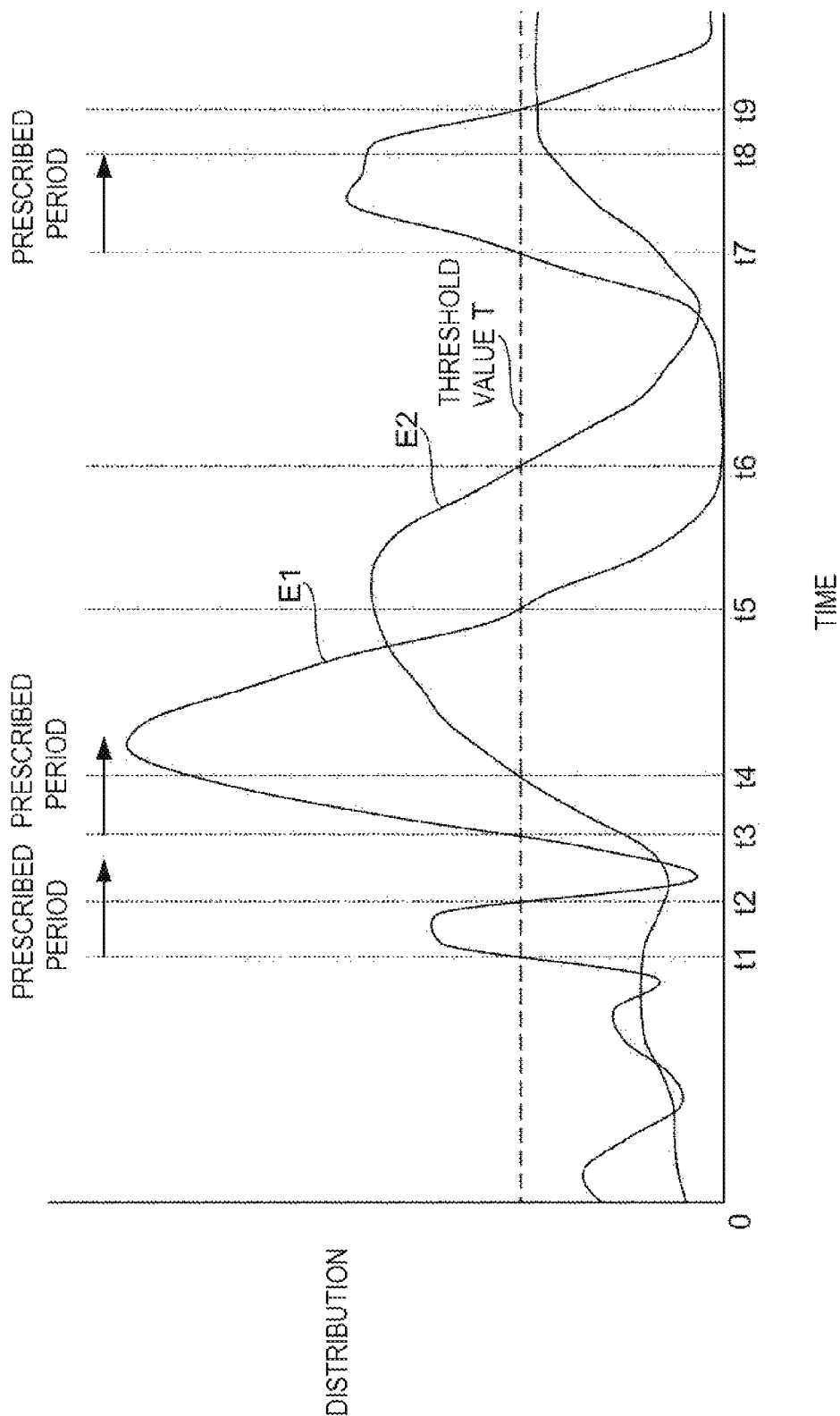
FIG. 11 is a diagram showing an example of the temporal change of the distribution value of Embodiment 1.

FIG. 11 shows an example of the temporal change of the movement average values E1 and E2 derived in the first and second rotation determination processes. In the first rotation determination process, in the time periods from the time 0 to t1, from the time t2 to t3, and from the time t5 to t7, the moving average value E1 is smaller than the threshold value T (Step S22, N), and thus, the first rotation determination unit 24 outputs FALSE as the first rotation determination result (Step S24). On the other hand, in the time periods from the time t1 to t2, from the time t3 to t5, and from the time t7 to t9, the moving average value E1 is equal to or greater than the threshold value T (Step S22, Y), and thus, the first rotation determination unit 24 outputs TRUE as the first rotation determination result (Step S23).

Since the moving average value E1 is derived using a shorter data section than that of the moving average value E2, the fluctuation due to temporary vibration such as between the time t1 and t2 and between the time t7 and t9 is large, for example, and therefore, the first rotation determination result has a problem that an erroneous determination is likely to occur in which the rotation determination is deemed TRUE even in the nonrotation state. On the other hand, the temporal change of the moving average value E1 such as between the time t3 and t4 and between the time t5 and t6, for example, has a smaller delay than the temporal change of the moving average value E2, and it is possible to determine the rotation state at high speed.

In the second rotation determination process, in the time periods from the time 0 to t4 and after the time t6, the moving average value E2 is smaller than the threshold value T (Step S22, N), and thus, the second rotation determination unit 26 outputs FALSE as the second rotation determination result (Step S24). On the other hand, in the time periods from the time t4 to t6, the moving average value E2 is equal to or greater than the threshold value T (Step S22, Y), and thus, the second rotation determination unit 26 outputs TRUE as the second rotation determination result (Step S23).

Since the moving average value E2 is derived using a longer data section than that of the moving average value E1, the temporal change of the moving average value E2 such as between the time t3 and t4 and between the time t5 and t6, for example, has a greater delay than the temporal change of the moving average value E1, and it takes a longer time to reach at the second rotation determination result. On the other hand, in the temporal change of the moving average value E2, the temporary vibration that occurs in the temporal change of the moving average value E1 such as between the time t1 and t2 and between the time t7 and t9, for example, does not occur, and therefore, the determination accuracy of the rotation state by the second rotation determination unit 26 is higher than the determination accuracy of the rotation state by the first rotation determination unit 24.

As described above, the first rotation determination result and the second rotation determination result, which respectively use the data sections of different lengths to derive the moving average value, have different characteristics. Thus, the third rotation determination unit 28 determines the final rotation state of the target device by combining of the first rotation determination result and the second rotation determination result, and outputs the third rotation determination result, which is the final result. This makes it possible to determine the rotation state of the target object accurately, even if the target object is in a moving state.

Figure 9:
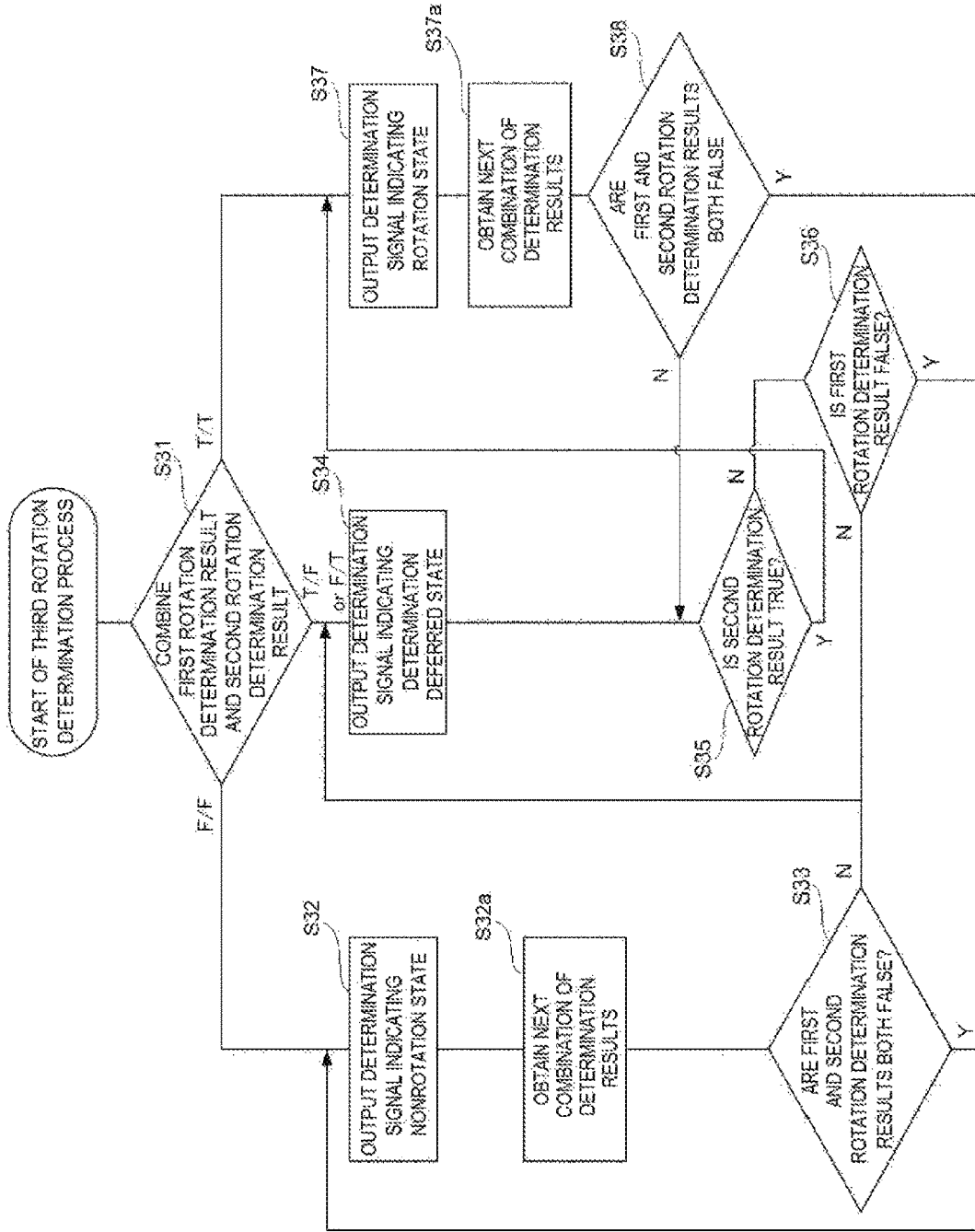
FIG. 9 is a flowchart showing an example of the third rotation determination process of Embodiment 1.

With reference to FIG. 9, the rotation determination process of this embodiment will be explained. The third rotation determination process of FIG. 9 is performed after the first rotation determination result and the second rotation determination result are derived, for example.

In Step S31, the third rotation determination unit 28 checks the combination of the first rotation determination result and the second rotation determination result. If the first rotation determination result and the second rotation determination result are both FALSE in Step S31, the process moves to Step S32. In Step S32, the third rotation determination unit 28 outputs a determination signal that indicates that the offset correction device 70 is in a nonrotation state as the third rotation determination result.

In Step S32a, the third rotation determination unit 28 obtains the next combination of the first rotation determination result and the second rotation determination result. In Step S33, the third rotation determination unit 28 checks the obtained next combination of the first rotation determination result and the second rotation determination result, and if both the results are FALSE (Step S33, Y), the process returns to Step S32. On the other hand, if at least one of the first rotation determination result and the second rotation determination result is TRUE in Step S33 (Step S33 N), the third rotation determination unit 28 moves to Step S34, which will be described below.

In Step S31, if one of the first rotation determination result and the second rotation determination result is TRUE and the other is FALSE, the third rotation determination unit 28 moves to Step S34. In Step S34, the third rotation determination unit 28 holds off on determining the rotation state of the target device, and outputs a determination signal that indicates the determination-deferred state as the third rotation determination result.

In Step S34a, the third rotation determination unit 28 obtains the next combination of the first rotation determination result and the second rotation determination result. In Step S35, the third rotation determination unit 28 determines whether the second rotation determination result of the obtained next combination is TRUE or not. If the second rotation determination result is TRUE (Step S35, Y), the process moves to Step S37, which will be described later. On the other hand, if the second rotation determination result is FALSE (Step S35, N), the process moves to Step S36.

In Step S36, the third rotation determination unit 28 determines whether the first rotation determination result is FALSE or not. If the first rotation determination result is FALSE (Step S36, Y), the process moves to Step S32. On the other hand, if the first rotation determination result is TRUE (Step S36, N), the process returns to Step S34.

If the first rotation determination result and the second rotation determination result are both TRUE in Step S31, the third rotation determination unit 28 moves to Step S37. In Step S37, the CPU 11 outputs a determination signal that indicates that the offset correction device 70 is in a rotation state as the third rotation determination result.

In Step S37a, the third rotation determination unit 28 obtains the next combination of the first rotation determination result and the second rotation determination result. In Step S38, the third rotation determination unit 28 checks the obtained next combination of the first rotation determination result and the second rotation determination result, and if both the results are FALSE (Step S38, Y), the process moves to Step S32. On the other hand, if at least one of the first rotation determination result and the second rotation determination result is TRUE in Step S38 (Step S38, N), the third rotation determination unit 28 moves to Step S35.

Next, the operation of the calculation unit 30 of this embodiment will be explained below. The CPU 11 performs the calculation period determination process by executing the calculation process program 16.

Figure 10:
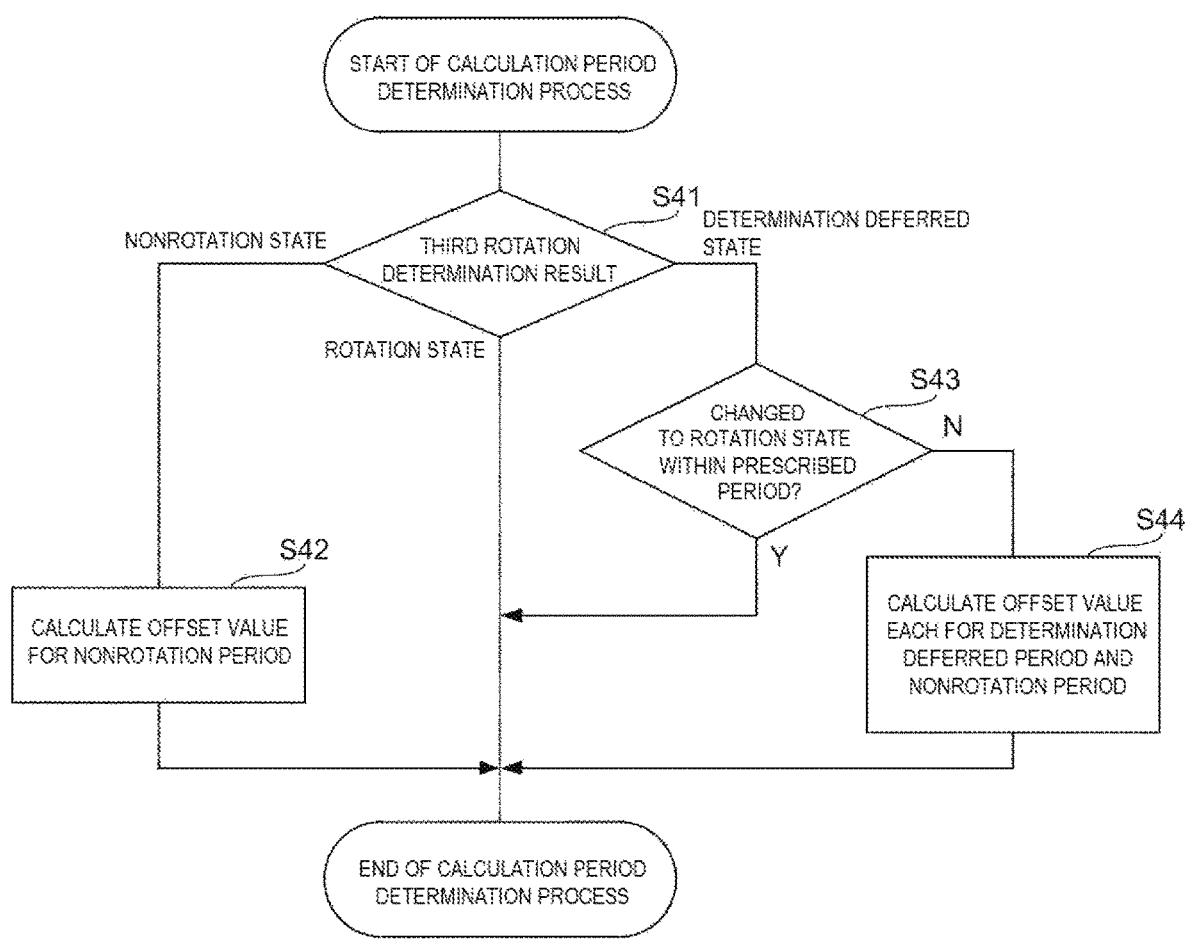
FIG. 10 is a flowchart showing an example of a calculation period determination process of Embodiment 1.

With reference to FIG. 10, the calculation period determination process will be explained. The calculation period determination process of FIG. 10 is conducted after the third rotation determination result is output from the third rotation determination unit 28, for example.

In Step S41, the calculation unit 30 determines whether the third rotation determination result indicates the nonrotation state, the determination-deferred state, or the rotation state.

If the third rotation determination result indicates the nonrotation state in Step S41, the process moves to Step S42. In Step S42, the calculation unit 30 calculates an offset value for the nonrotation period during which a determination signal output as the third rotation determination result indicates the nonrotation state.

If the third rotation determination result indicates the rotation state in Step S41, the calculation unit 30 ends the calculation period determining process. That is, an offset value is not calculated for the rotation period during which a determination signal output as the third rotation determination result indicates the rotation state.

If the third rotation determination result indicates the determination-deferred state in Step S41, the process moves to Step S43. In Step S43, the calculation unit 30 determines whether a determination signal indicating the rotation state was output as the third rotation determination result within a prescribed period of time after the determination signal indicating the determination-deferred state was first output as the third rotation determination result. That is, the calculation unit 30 stands by until a determination signal indicating the rotation state or nonrotation state is output from the third rotation determination unit 28 before the prescribed period has passed. The prescribed period is a period of time that is set in advance.

If a determination signal indicating the rotation state is output during the prescribed period in Step S43, the calculation unit 30 ends the calculation period determination process. That is, the calculation unit 30 presumes that the device was in the rotation state during the determination-deferred period, during which a determination signal indicating the determination-deferred state has been output as the third rotation determination result, and does not calculate an offset value based on the sensor data corresponding to this determination-deferred period.

If a determination signal indicating the nonrotation state is output during the prescribed period in Step S43, the calculation unit 30 moves to Step S44. In Step S44, the calculation unit 30 calculates an offset value for each of the determination-deferred period and the nonrotation period. That is, the calculation unit 30 presumes that the device was in the nonrotation state during the determination-deferred period, and calculates an offset value for each of the determination-deferred period and the nonrotation period. Also, if the determination signal indicating the determination-deferred state is continuously output after the prescribed period of time has passed, a process similar to the case in which the determination signal indicating the nonrotation state is output is performed in Step S44.

Next, with reference to FIG. 9, an example of the third rotation determination process and the calculation period determination process will be explained. First, the case in which the moving average values E1 and E2 change as in the period from the time 0 to t1, for example, will be explained. At the time 0, both the first rotation determination result and the second rotation determination result are FALSE (Step S31, F/F), and therefore, the third rotation determination unit 28 outputs the determination signal indicating the nonrotation state (Step S32). Then from the time 0 to t1, both the first rotation determination result and the second rotation determination result are again FALSE (Step S33, Y), and therefore, the third rotation determination unit 28 continues to output the determination signal indicating the nonrotation state from the time 0 to t1 (Step S32). Because the determination signal indicates the nonrotation state (Step S41, nonrotation state), the calculation unit 30 calculates an offset value based on the sensor data corresponding to the period from the time 0 to t1 (Step S42).

Next, the case in which the moving average values E1 and E2 change as shown in the period from the time t1 to t2, for example, will be explained. At the time 1, the first rotation determination result is TRUE (Step S33, N), and therefore, the third rotation determination unit 28 outputs the determination signal indicating the determination-deferred state (Step S34). Then from the time t1 to t2, the second rotation determination result is FALSE (Step S35, N) and the first rotation determination result is TRUE (Step S36, N), and therefore, the third rotation determination unit 28 continues to output the determination signal indicating the determination-deferred state from the time t1 to t2 (Step S34).

At the time t2, the first rotation determination result is FALSE (Step S36, Y), and therefore, the third rotation determination unit 28 outputs the determination signal indicating the nonrotation state (Step S32). Because the determination signal indicating the nonrotation state is output within a prescribed period of time from the time t1 at which the determination-deferred state is detected (Step S43, changed to the nonrotation state), the calculation unit 30 presumes that the device was in the nonrotation state during the determination-deferred period from t1 to t2, and calculates an offset value based on the sensor data corresponding to the time t1 to t2 (Step S44).

Next, the case in which the moving average values E1 and E2 change as shown in the period from the time t3 to t5, for example, will be explained. At the time 3, the first rotation determination result is TRUE (Step S33, N), and therefore, the third rotation determination unit 28 outputs the determination signal indicating the determination-deferred state (Step S34). Also, from the time t3 to t4, the second rotation determination result is FALSE (Step S35, N) and the first rotation determination result is TRUE (Step S36, N), and therefore, the third rotation determination unit 28 continues to output the determination signal indicating the determination-deferred state from the time t1 to t2 (Step S34).

At the time t4, the second rotation determination result is TRUE (Step S35, Y), and therefore, the third rotation determination unit 28 outputs the determination signal indicating the rotation state (Step S37). Because the determination signal indicating the rotation state is output within a prescribed period of time from the time t3 at which the determination-deferred state is detected (Step S43, changed to the rotation state), the calculation unit 30 presumes that the device was in the rotation state during the determination-deferred period t3 to t4, and does not calculate an offset value based on the sensor data corresponding to the time t3 to t4.

Also, from the time t4 to t5, both the first rotation determination result and the second rotation determination result are TRUE (Step S38, N) (Step S35, Y), and therefore, the third rotation determination unit 28 continues to output the determination signal indicating the rotation state from the time t4 to t5 (Step S37). As a result, the calculation unit 30 does not calculate an offset value based on the sensor data corresponding to the period from the time t4 to t5 (Step S41, rotation state).

Next, the case in which the moving average values E1 and E2 change as shown in the period from the time t5 to t6, for example, will be explained. At the time 5, the first rotation determination result is FALSE, and the second rotation determination result is TRUE (Step S38, N), and therefore, the third rotation determination unit 28 outputs the determination signal indicating the rotation state (Step S37). As a result, the calculation unit 30 does not calculate an offset value based on the sensor data corresponding to the period from the time t5 to t6 (Step S41, rotation state).

Next, the case in which the moving average values E1 and E2 change as shown in the period from the time t7 to t9, for example, will be explained. At the time t7, the first rotation determination result is TRUE (Step S33, N), and therefore, the third rotation determination unit 28 outputs the determination signal indicating the determination-deferred state (Step S34). Then from the time t7 to t8, the second rotation determination result is FALSE (Step S35, N) and the first rotation determination result is TRUE (Step S36, N), and therefore, the third rotation determination unit 28 continues to output the determination signal indicating the determination-deferred state from the time t7 to t8 (Step S34).

At the time t8, a prescribed period of time has passed from the time t7. From the time t8 to t9, the second rotation determination result is still FALSE (Step S35, N) and the first rotation determination result is still TRUE (Step S36, N), and therefore, the third rotation determination unit 28 continues to output the determination signal indicating the determination-deferred state from the time t7 to t9 (Step S34). Because the determination signal indicating the rotation state is not output within a prescribed period of time from the time t7 (Step S43, N), the calculation unit 30 presumes that the device was in the nonrotation state during the determination-deferred period t7 to t9, and calculates an offset value based on the sensor data corresponding to the time t7 to t9 (Step S44).

As described above, according to the third rotation determination process and the calculation period determination process of this embodiment, the calculation unit 30 generates an output regarding a rotation state of a gyro based on a presumption, for example, that the reason for the first rotation determination result being TRUE from the time t1 to t2 was the temporary vibration, and the device itself was in the nonrotation state during that time. Also, the calculation unit generates an output based on a presumption that the reason for the first rotation determination result being TRUE from the time t3 to t4 was because the second rotation determination result was delayed and behind the first rotation determination result, and the device itself was in the rotation state during that time. Further, the calculation unit generates an output based on a presumption that the reason for the second rotation determination result being TRUE from the time t5 to t6 was because the second rotation determination result was delayed and behind the first rotation determination result or because the first rotation determination result was temporarily FALSE, and the device itself was in the rotation state during that time. Furthermore, the calculation unit generates an output based on a presumption, for example, that the reason for the first rotation determination result being TRUE from the time t7 to t9 was the off-centered vibration caused by the moving state, and the device itself was in the nonrotation state during that time. While examples of reasons for presumptions for particular outputs are provided, above, these represent only common occurrences, and other specific reasons for a difference in values E1 and E2 may be true or presumed. The result, however, is that a rotation state may be determined with greater accuracy by using both the values E1 and E2, which are based on moving averages over different spans of time, than when using only one set of values from a gyro sensor.

That is, the calculation unit 30 can calculate an offset value for a period of time in which the target device was deemed to be in a nonrotation state. Also, it is possible to determine the rotation state of the determination-deferred period retrospectively, and decide whether the offset value is to be calculated or not.

As described above, according to this embodiment, the determination unit 20 determines a rotation state of an object to be sensed by the gyro sensor 50 based on a moving average value of a plurality of time periods differing from each other, the moving average value being calculated from time-series data of numerical values corresponding to the sensor data output from the gyro sensor 50, and the calculation unit 30 calculates an offset value of the sensor data based on the sensor data corresponding to a time period in which the object was deemed to be in a nonrotation state by the determination unit 20. That is, the rotation state is determined based on the moving average value derived from a plurality of data sections that differ from each other in length, which makes it possible to accurately determine the rotation state, and as a result, the offset value can be accurately calculated even if the target device is in the moving state.

Also, according to this embodiment, the rotation state can be determined accurately based on the sensor data output from the gyro sensor 50 only, even if the target device is in the moving state. This means that an offset value can be calculated without other sensors to determine whether the device is in a moving state or not (such as accelerometer or geomagnetic sensor). Embodiments of the invention encompass a device for calculating the rotation state of a gyro without using an accelerometer or geomagnetic sensor.

In this embodiment, the rotation state was determined based on a combination of the first rotation determination result and the second rotation determination result, but the present invention is not limited to this. For example, the final rotation state can be determined based on a combination of three or more temporary rotation determination results by deriving another distribution value using a data section having a different length from the data sections used to derive the moving average values E1 and E2 and comparing the distribution value with a threshold value T.

In this embodiment, the rotation state was determined based on the moving average values E1 and E2, which are the distribution values of the sensor data, but the present invention is not limited to this. For example, a short-term average and a long-term average of the sensor data may be derived instead of the distribution value, and the short-term average and long-term average may be used to determine the rotation state.

Embodiment 2

In the offset calculation device 10 of Embodiment 1, described above, the calculation unit 30 performs the moving average process on the sensor data corresponding to a period of time in which the target device is deemed to be in a non-rotation state, and outputs the moving average value as an offset value. In this case, if vibration that occurs in the sensor data of the non-rotation state is as illustrated with FIG. 1A, the offset value can be detected accurately. However, in a case in which the vibration that occurs in the sensor data of the non-rotation state is off-centered vibration as shown in FIG. 2A, if the moving average value derived from the sensor data is output as an offset value, the shifted vibration would create another offset. Thus, the offset calculation device 10 of Embodiment 1 calculates an offset value taking into consideration the off-centered vibration of the sensor data.

Figure 12:
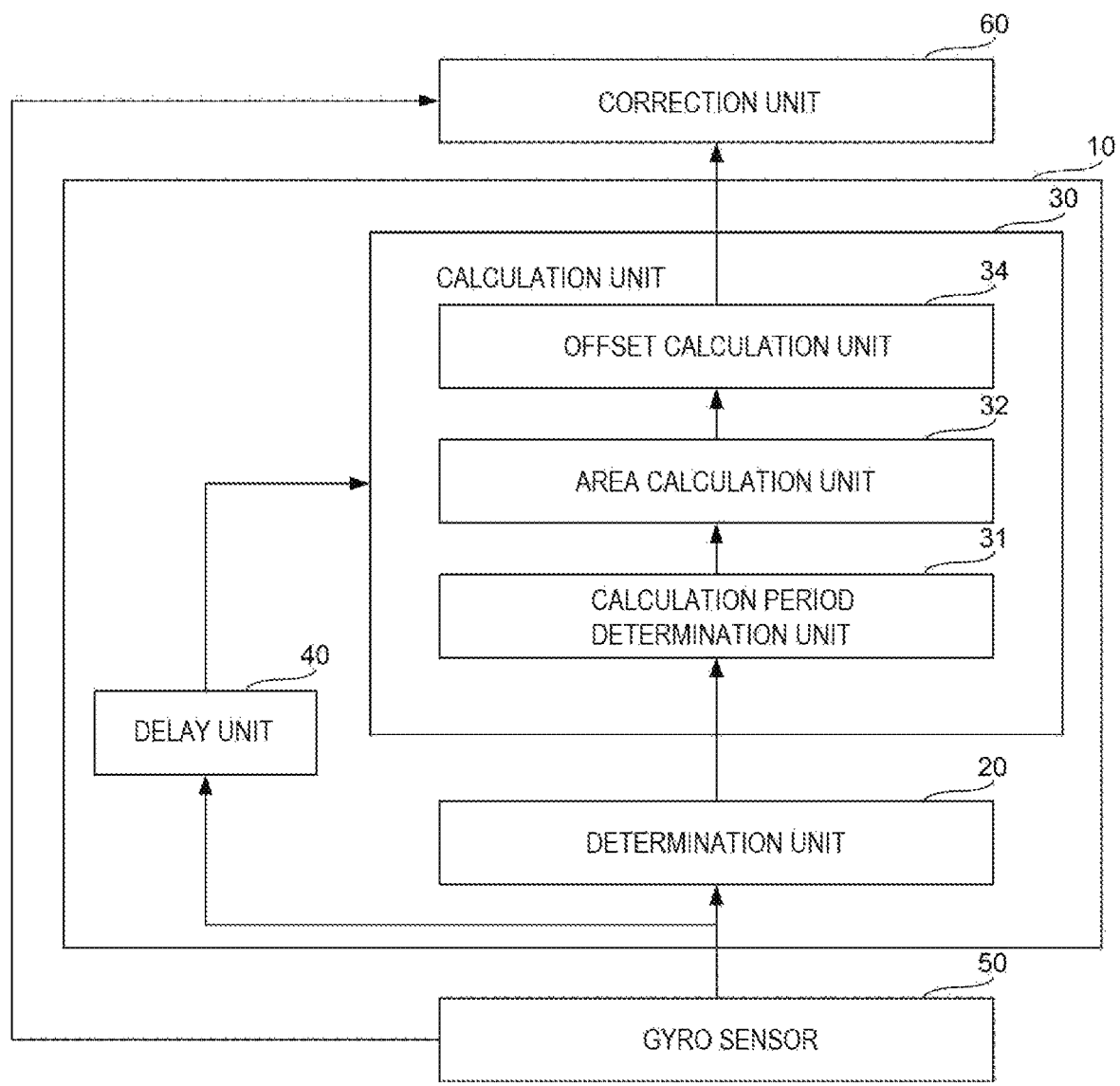
FIG. 12 is a functional block diagram illustrating an example of the functional configuration of an offset calculation device of Embodiment 2.

With reference to FIG. 12, the functional configuration of the offset calculation device 10 of this embodiment will be explained. This embodiment differs from Embodiment 1 in the functional configuration of the calculation unit 30. The CPU 11 functions as the calculation unit 30 by executing the calculation process program 16. The other functional configurations are the same as those of Embodiment 1, and the explanation thereof will not be repeated below.

The calculation unit 30 calculates an offset value of the sensor data based on the numerical values according to the areas of the waveform sections of the signal waveform representing the temporal change of the sensor data during a prescribed period of time.

The calculation unit 30 includes a calculation period determination unit 31, an area calculation unit 32, and an offset calculation unit 34. The calculation period determination unit 31 conducts the calculation period determination process explained in Embodiment 1. The area calculation unit 32 calculates the area of the waveform section on the positive side and the area of the waveform section on the negative side of the signal waveform representing the temporal change of the sensor data during the prescribed period of time. The offset calculation unit 34 calculates the offset value of the sensor data by dividing the difference between the positive-side waveform section area and the negative-side waveform section area by a numerical value corresponding to the prescribed period of time. That is, the offset calculation unit 34 calculates an offset value of the sensor data such that a positive-side waveform section and a negative-side waveform section of a signal waveform indicated by a temporal change of the sensor data, which was corrected by the correction unit 60, over a prescribed period of time, are equal to each other.

Next, the operation of the calculation unit 30 of this embodiment will be explained below. By the CPU 11 executing the calculation process program 16, the calculation period determination process in the calculation period determination unit 31, the area calculation process in the area calculation unit 32, and the offset calculation process in the offset calculation unit 34 are conducted.

Figure 13:
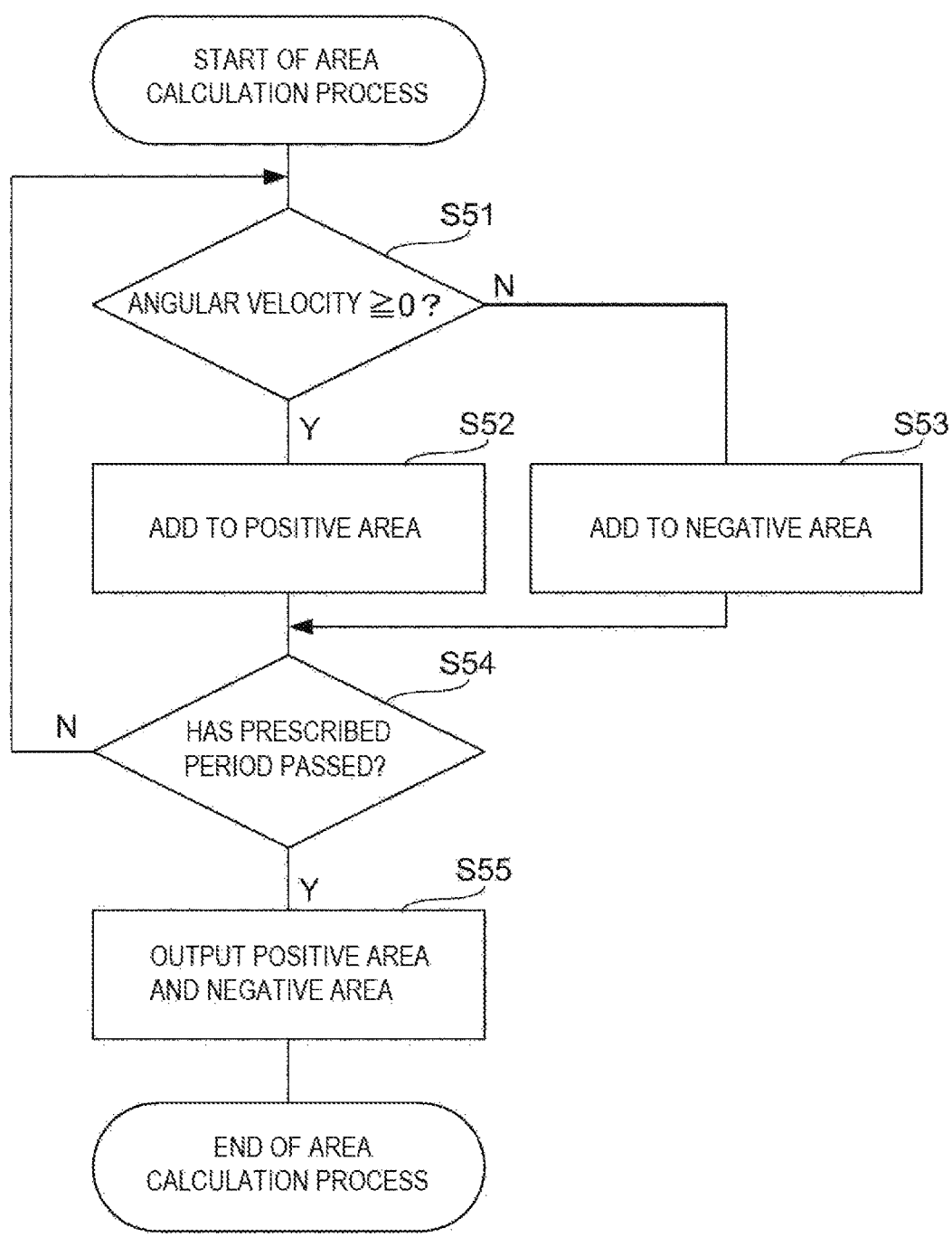
FIG. 13 is a flowchart showing an example of an area calculation process of Embodiment 2.

First, with reference to FIG. 13, the area calculation process of this embodiment will be explained. The area calculation process of FIG. 13 is conducted after the calculation period determination unit 31 has determined a period of time for which an offset value is to be calculated, for example.

In Step S51, the area calculation unit 32 determines whether or not the angular velocity value of the sensor data output from the delay unit 40 is zero or greater. If the sensor data is zero or greater (Step S51, Y), the area calculation unit 32 adds the angular velocity value to the positive area (Step S52), and moves to Step S54.

On the other hand, if the angular velocity value of the sensor data is smaller than 0 (Step S51, N), the area calculation unit 32 adds the angular velocity value to the negative area (Step S53), and moves to Step S54. In the calculation of the offset calculation process, an absolute value of the negative area is used.

In Step S54, the area calculation unit 32 first determines whether a prescribed period of time has passed since Step S51 or not, and if the prescribed period of time has not passed, the area calculation unit 32 repeats the process from Step S51 to S53. The prescribed period of time is a period of time corresponding to the minimum integration number required to calculate the offset value.

If the prescribed period of time has passed (Step S54, Y), the area calculation unit 32 moves to Step S55, and outputs the positive area and the negative area.

In calculating the area, it is not necessary to time-integrate the angular velocity value. Because the area is differentiated by time in calculating the offset value in the offset calculation process, the angular velocity value may be integrated to simplify the calculation.

Figure 14:
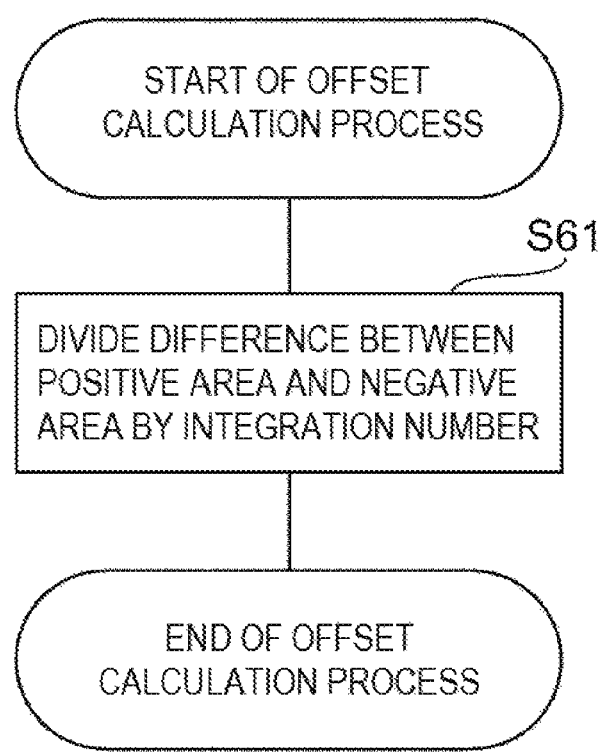
FIG. 14 is a flowchart showing an example of an offset calculation process of Embodiment 2.

Next, with reference to FIG. 14, the offset calculation process of this embodiment will be explained. The offset calculation process of FIG. 14 is performed after the area calculation unit 32 outputs the positive area and the negative area.

In Step S61, the offset calculation unit 34 calculates a difference between the positive area and the negative area, and divides the difference by the integration number in the integration process performed to derive the positive area and the negative area. The resultant value is the offset value. That is, the offset value is a value calculated such that a positive area and a negative area of a signal waveform representing a temporal change of the sensor data, which was corrected by the correction unit 60, over a prescribed period of time are equal to each other.

The offset value calculated in this way takes into consideration both the offset of the gyro sensor 50 and the off-centered vibration, and thus, it is possible to calibrate the gyro sensor 50 and the off-centered vibration at the same time.

As described above, in this embodiment, the calculation unit 30 calculates the offset value of the sensor data based on the numerical value corresponding to the areas of the waveform sections of the signal waveform representing the temporal change over a prescribed period of time of the sensor data corresponding to the time period in which the target device was deemed to be in a non-rotation state. This makes it possible to accurately calculate the offset value even when uneven vibration occurs in the sensor data in the non-rotation state.

In this embodiment, a numerical value corresponding to the area of the sensor data was used for a value to calculate an offset value, but the present invention is not limited to this. For example, an average of the maximum value of the positive side and the minimum value of the negative side can be used.

In the respective embodiments above, the gyro sensor 50 was used for an example of an angular velocity sensor, but the present invention is not limited to this. For example, it is possible to calculate an offset value of the sensor data by determining the rotation state of the target device using sensor data output from a geomagnetic sensor.

DESCRIPTIONS OF REFERENCE CHARACTERS

- 10 Offset Calculation Device
- 11 CPU
- 12 Memory
- 13 I/O Port
- 14 Storage Unit
- 15 Determination Process Program
- 16 Calculation Process Program
- 17 Delay Process Program
- 20 Determination Unit
- 22 Deriving Unit
- 24 First Rotation Determination Unit
- 26 Second Rotation Determination Unit
- 28 Third Rotation Determination Unit
- 30 Calculation Unit
- 31 Calculation Period Determination Unit
- 32 Area Calculation Unit
- 34 Offset Calculation Unit
- 40 Delay Unit
- 50 Gyro Sensor
- 60 Correction Unit
- 70 Offset Correction Device

What is claimed is:

1. An offset calculation device, comprising:
   a determination unit configured to determine a rotation state of an object having an angular velocity sensed by an angular velocity sensor based on a moving average value of sensed angular velocity values in a plurality of time periods including at least a first time period and a second time period differing in duration from the first time period, the moving average value being calculated from time-series data of numerical values corresponding to sensor data output from the angular velocity sensor; and
   a calculation unit configured to calculate an offset value of the sensor data based on the sensor data corresponding to a time period in which the object was deemed to be in a non-rotation state by the determination unit.

2. The offset calculation device according to claim 1, wherein the numerical values corresponding to the sensor data are numerical values corresponding to distribution values of the moving average of the sensor data.

3. The offset calculation device according to claim 1, wherein the determination unit includes:
   a first rotation determination unit configured to determine a rotation state of the object based on a moving average value of a first period derived from time-series data of numerical values of the sensor data;
   a second rotation determination unit configured to determine a rotation state of the object based on a moving average value of a second period that is longer than the first period derived from time-series data of numerical values of the sensor data; and
   a third rotation determination unit configured to determine a rotation state of the object based on a combination of a determination result of the first rotation determination unit and a determination result of the second rotation determination unit.

4. The offset calculation device according to claim 3, wherein, when a determination result of the first rotation determination unit indicates a non-rotation state, and a determination result of the second rotation determination unit indicates a rotation state, a determination on whether the object is in a rotation state or non-rotation state is made after a prescribed period of time has passed.

5. The offset calculation device according to claim 4, wherein, when the object is deemed to be in a non-rotation state after the prescribed period of time has passed, the calculation unit calculates an offset value of the sensor data based on the sensor data corresponding to the prescribed period of time.

6. The offset calculation device according to claim 5, wherein the third rotation determination unit determines whether the object is in a rotation state, a non-rotation state, or determination-deferred state, based on a combination of a determination result of the first rotation determination unit and a determination result of the second rotation determination unit, and
   wherein, when a determination result of the third rotation determination unit indicates that the object is in a non-rotation state or the object is in the determination-deferred state continuously during the prescribed period of time, the calculation unit calculates an offset value of the sensor data.

7. The offset calculation device according to claim 6, wherein, when a determination result of the third rotation determination unit changes from a determination-deferred state of the object to a non-rotation state within the prescribed period of time, the calculation unit calculates an offset value of the sensor data based on the sensor data corresponding to a period of time in which the object was in the determination-deferred state.

8. The offset calculation device according to claim 1, further comprising a delay unit configured to delay the sensor data by a prescribed delay time and output the sensor data, wherein the calculation unit calculates an offset value of the sensor data using the delayed sensor data output from the delay unit.

9. The offset calculation device according to claim 1, wherein the calculation unit calculates an offset value of the sensor data based on numerical values corresponding to areas of waveform sections of a signal waveform representing a temporal change of the sensor data over a prescribed period of time.

10. The offset calculation device according to claim 9, wherein the calculation unit calculates an offset value of the sensor data by dividing a difference between a positive-side waveform section and a negative-side waveform section of the signal waveform representing the temporal change of the sensor data over a prescribed period of time by a numerical value corresponding to the prescribed period of time.

11. An offset correction device, comprising:
the offset calculation device according to claim 1; and
a correction unit configured to correct the sensor data based on the offset value of the sensor data calculated by the calculation unit of the offset calculation device, wherein the calculation unit calculates an offset value of the sensor data such that a positive-side waveform section and a negative-side waveform section of a signal waveform representing a temporal change of the sensor data over a prescribed period of time are equal to each other.

12. An offset calculation method, comprising:
determining a rotation state of an object having an angular velocity sensed by an angular velocity sensor based on a moving average value of sensed angular velocity values during a plurality of time periods including at least a first time period and a second time period differing in duration from the first time period, the moving average value being calculated from chronological data of numerical values corresponding to the sensor data output from the angular velocity sensor; and
calculating an offset value of the sensor data based on the sensor data corresponding to the time period in which the object was deemed to be in a non-rotation state.

* * * * *